(12) United States Patent
Xiang et al.

(10) Patent No.: US 9,992,803 B2
(45) Date of Patent: Jun. 5, 2018

(54) WI-FI NETWORK CONNECTION METHOD, WI-FI CONTROLLER, AND WI-FI DEVICE

(71) Applicant: Huawei Device Co., Ltd., Shenzhen (CN)

(72) Inventors: Chao Xiang, Xi'an (CN); Ping Yu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 267 days.

(21) Appl. No.: 14/862,747

(22) Filed: Sep. 23, 2015

(65) Prior Publication Data

US 2016/0014824 A1  Jan. 14, 2016

Related U.S. Application Data

(63) Continuation of application No. PCT/CN2014/076808, filed on May 5, 2014.

(51) Int. Cl.
| | |
|---|---|
| H04W 76/02 | (2009.01) |
| H04W 72/02 | (2009.01) |
| H04W 16/10 | (2009.01) |
| H04W 48/16 | (2009.01) |
| H04W 72/04 | (2009.01) |
| H04W 84/12 | (2009.01) |
| H04W 48/12 | (2009.01) |

(52) U.S. Cl.
CPC ........... *H04W 76/02* (2013.01); *H04W 16/10* (2013.01); *H04W 48/16* (2013.01); *H04W 72/02* (2013.01); *H04W 48/12* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 2007/0237121 A1 | 10/2007 | Khandelwal et al. |
| 2008/0259882 A1 | 10/2008 | Abdel-Kader et al. |

(Continued)

FOREIGN PATENT DOCUMENTS

| CN | 102256336 A | 11/2011 |
| CN | 103442351 A | 12/2013 |

(Continued)

OTHER PUBLICATIONS

Partial English Translation and Abstract of Chinese Patent Application No. CN103533604, Sep. 2, 2015, 13 pages.

(Continued)

*Primary Examiner* — Chi H Pham
*Assistant Examiner* — Raul Rivas
(74) *Attorney, Agent, or Firm* — Conley Rose, P.C.

(57) ABSTRACT

A wireless fidelity (Wi-Fi) network connection method, a Wi-Fi controller and a Wi-Fi device. The Wi-Fi network connection method includes acquiring, by a first Wi-Fi device, at least one packet broadcasted by a second Wi-Fi device, where each packet includes channel information, determining, by the first Wi-Fi device, target channel information according to the channel information of the at least one packet, and performing, by the first Wi-Fi device according to the target channel information, Wi-Fi network access or providing a hotspot service for a user equipment.

19 Claims, 5 Drawing Sheets

(56) References Cited

U.S. PATENT DOCUMENTS

| | | | | |
|---|---|---|---|---|
| 2010/0111006 | A1* | 5/2010 | Zhai | H04W 99/00 370/329 |
| 2010/0226319 | A1* | 9/2010 | Hasegawa | H04W 72/085 370/329 |
| 2014/0099914 | A1* | 4/2014 | Ngai | H04W 24/08 455/405 |
| 2014/0274039 | A1* | 9/2014 | Shah | H04W 48/16 455/434 |
| 2014/0328257 | A1* | 11/2014 | Kamlani | H04W 24/02 370/329 |

FOREIGN PATENT DOCUMENTS

| | | | |
|---|---|---|---|
| CN | 103533604 | A | 1/2014 |
| EP | 1587221 | A2 | 10/2005 |
| EP | 2552134 | A1 | 1/2013 |
| JP | 2013031200 | A | 2/2013 |
| WO | 2013003378 | A1 | 1/2013 |
| WO | 2013030514 | A1 | 3/2013 |
| WO | 2014043500 | A1 | 3/2014 |
| WO | WO 2014043500 | A1 * | 3/2014 ............ H04W 36/22 |

OTHER PUBLICATIONS

Foreign Communication From a Counterpart Application, PCT Application No. PCT/CN2014/076808, English Translation of International Search Report dated Feb. 9, 2015, 2 pages.

Foreign Communication From a Counterpart Application, PCT Application No. PCT/CN2014/076808, Written Opinion dated Feb. 9, 2015, 4 pages.

Partial English Translation and Abstract of Japanese Patent Application No. JPA201331200, Dec. 14, 2016, 79 pages.

Foreign Communication From a Counterpart Application, Japanese Application No. 2016-517136, Japanese Office Action dated Nov. 1, 2016, 4 pages.

Foreign Communication From a Counterpart Application, Japanese Application No. 2016-517136, English Translation of Japanese Office Action dated Nov. 1, 2016, 4 pages.

Foreign Communication From a Counterpart Application, European Application No. 14884266.9, Extended European Search Report dated Apr. 28, 2016, 8 pages.

* cited by examiner

WI-FI NETWORK CONNECTION METHOD, WI-FI CONTROLLER, AND WI-FI DEVICE

CROSS-REFERENCE TO RELATED APPLICATIONS

This application is a continuation of International Application No. PCT/CN2014/076808, filed on May 5, 2014, which is hereby incorporated by reference in its entirety.

TECHNICAL FIELD

Embodiments of the present disclosure pertain to the field of communications technologies, and in particular, to a Wireless Fidelity (Wi-Fi) network connection method, a Wi-Fi controller, and a Wi-Fi device.

BACKGROUND

As the Wi-Fi technology develops continuously, a Wi-Fi network has been applied more widely. Wi-Fi channels used by various countries and requirements for the Wi-Fi channels may be different.

When a Wi-Fi device uses a Wi-Fi network in each country, a Wi-Fi communication requirement of a local country needs to be met. However, as the Wi-Fi technology develops rapidly, communication channels and requirements of various countries are also changing continuously. Therefore, when a channel list preset on the Wi-Fi device is not updated in a timely manner, local Wi-Fi networks in different countries may not be properly used according to the set channel list.

SUMMARY

Embodiments of the present disclosure provide a Wi-Fi network connection method, a Wi-Fi controller, and a Wi-Fi device, so as to resolve a problem that an existing Wi-Fi device often cannot use a local Wi-Fi network properly in different countries according to a set channel list.

To achieve the foregoing purpose, the following technical solutions are adopted in the embodiments of the present disclosure. According to a first aspect, a Wi-Fi network connection method is provided, including acquiring, by a first Wi-Fi device, at least one packet broadcasted by a second Wi-Fi device, where each packet includes channel information, determining, by the first Wi-Fi device, target channel information according to the channel information of the at least one packet, and performing, by the first Wi-Fi device according to the target channel information, Wi-Fi network access or providing a hotspot service for a user equipment.

In a first possible implementation manner of the first aspect, the channel information includes a channel list and the at least one packet includes multiple packets, and the determining target channel information according to the channel information of the at least one packet includes acquiring multiple channel lists of the multiple packets, and determining a target channel list according to the multiple channel lists and using the target channel list as the target channel information, or, The at least one packet includes one packet and the channel information includes a channel list, and the determining target channel information according to the channel information of the at least one packet includes: acquiring the channel list of the one packet and using the acquired channel list as the target channel information.

With reference to the first possible implementation manner of the first aspect, in a second possible implementation manner, the determining a target channel list according to the multiple channel lists includes comparing channels of the multiple channel lists, counting a quantity of channel lists having the same channel, and when the quantity reaches a first set value, determining that the channel lists having a same channel are the target channel list.

With reference to the first aspect, in a third possible implementation manner, the channel information includes a country code and the at least one packet includes multiple packets, and the determining target channel information according to the channel information of the at least one packet includes acquiring multiple country codes of the multiple packets, and determining a target country code according to the multiple country codes and using the target country code as the target channel information, or the at least one packet includes one packet and the channel information includes a country code, and the determining target channel information according to the channel information of the at least one packet includes: acquiring the country code of the packet and using the acquired country code as the target channel information.

With reference to the third possible implementation manner of the first aspect, in a fourth possible implementation manner, the determining a target country code according to the multiple country codes includes comparing the multiple country codes, counting a quantity of same country codes, and when the quantity reaches a second set value, determining that the same country codes are the target country code.

With reference to the first aspect or any one of the foregoing possible implementation manners, in a fifth possible implementation manner, the performing, by the first Wi-Fi device according to the target channel information, Wi-Fi network access or providing a hotspot service for a user equipment includes searching for, by the first Wi-Fi device according to the target channel information, a pre-stored channel list corresponding to the target channel information in a pre-stored channel information list; and performing, by the first Wi-Fi device according to the pre-stored channel list corresponding to the target channel information, Wi-Fi network access or providing a hotspot service for a user equipment, where the pre-stored channel information list includes a one-to-one correspondence between a pre-stored country code and a pre-stored channel list, and the pre-stored channel information list includes at least one one-to-one correspondence.

With reference to the first aspect or any one of the foregoing possible implementation manners, in a sixth possible implementation manner, the pre-stored channel information list further includes a first correspondence between the pre-stored country code and a pre-stored interfered channel, and before the performing, by the first Wi-Fi device according to the target channel information, Wi-Fi network access or providing a hotspot service for a user equipment, the method further includes determining, by the first Wi-Fi device according to the target channel information and the first correspondence, an interfered channel corresponding to the target channel information, if the first Wi-Fi device determines that the first Wi-Fi device supports an interference processing feature, performing Wi-Fi network access or providing a hotspot service for a user equipment by using any channel of the pre-stored channel list or the acquired channel list of the channel information, or if the first Wi-Fi device determines that the first Wi-Fi device does not support an interference processing feature, performing Wi-Fi network access or providing a hotspot service for a user equipment by using an interference-free channel of the pre-stored channel list or the acquired channel list of the channel information, where the interference processing feature includes a dynamic frequency selection (DFS) feature or a transmit power control (TPC) feature.

With reference to the first aspect or any one of the foregoing possible implementation manners, in a seventh possible implementation manner, after the performing, by the first Wi-Fi device according to the target channel information, Wi-Fi network access or providing a hotspot service for a user equipment, the method further includes if the first Wi-Fi device determines that a currently used Wi-Fi network channel is interfered, and determines that the first Wi-Fi device supports a DFS feature, switching to an interference-free channel to perform Wi-Fi network access or provide a hotspot service for a user equipment.

With reference to the first aspect or any one of the foregoing possible implementation manners, in an eighth possible implementation manner, after the performing, by the first Wi-Fi device according to the target channel information, Wi-Fi network access or providing a hotspot service for a user equipment, the method further includes if the first Wi-Fi device determines that a currently used Wi-Fi network channel is interfered, and determines that the first Wi-Fi device supports a TPC feature, reducing transmit power of the first Wi-Fi device.

With reference to the first aspect or any one of the foregoing possible implementation manners, in a ninth possible implementation manner, after the performing, by the first Wi-Fi device according to the target channel information, Wi-Fi network access or providing a hotspot service for a user equipment, the method further includes if the first Wi-Fi device determines that a currently used Wi-Fi network channel is interfered, and determines that the first Wi-Fi device does not support an interference processing feature, prompting a user to manually configure the channel or disconnect a Wi-Fi network, where the interference processing feature includes a DFS feature or a TPC feature.

With reference to the ninth possible implementation manner of the first aspect, in a tenth possible implementation manner, before the determining, by the first Wi-Fi device, target channel information according to the channel information of the at least one packet, the method further includes: receiving, by the first Wi-Fi device, an update signal of an update channel, where the update signal is a roaming signal, an initial device use signal, a subscriber identity module (SIM)/User Identity Module (UIM) card insertion signal, a timing signal, or a power-on signal.

According to a second aspect, a Wi-Fi controller is provided, including a Wi-Fi control module, where the Wi-Fi control module is configured to control a Wi-Fi chip to acquire at least one packet broadcasted by a second Wi-Fi device, where each packet includes channel information, the Wi-Fi control module determines target channel information according to the channel information of the at least one packet, and the Wi-Fi control module controls, according to the target channel information, the Wi-Fi chip to perform Wi-Fi network access or provide a hotspot service for a user equipment.

In a first possible implementation manner of the second aspect, the channel information includes a channel list and the at least one packet includes multiple packets, and that the Wi-Fi control module determines target channel information according to the channel information of the at least one packet includes acquiring, by the Wi-Fi control module, multiple channel lists of the multiple packets; and determining a target channel list according to the multiple channel lists and using the target channel list as the target channel information, or the at least one packet includes one packet and the channel information includes a channel list, and that the Wi-Fi control module determines target channel information according to the channel information of the at least one packet includes: acquiring, by the Wi-Fi control module, the channel list of the one packet and using the acquired channel list as the target channel information.

With reference to the second aspect or the foregoing first possible implementation manner, in a second possible implementation manner, the determining, by the Wi-Fi control module, a target channel list according to the multiple channel lists includes comparing, by the Wi-Fi control module, channels of the multiple channel lists; counting a quantity of channel lists having the same channel; and when the quantity reaches a first set value, determining that the channel lists having a same channel are the target channel list.

With reference to the second aspect or any one of the foregoing possible implementation manners, in a third possible implementation manner, the channel information includes a country code and the at least one packet includes multiple packets, and that the Wi-Fi control module determines target channel information according to the channel information of the at least one packet includes acquiring, by the Wi-Fi control module, multiple country codes of the multiple packets; and determining a target country code according to the multiple country codes and using the target country code as the target channel information, or the at least one packet includes one packet and the channel information includes a country code; and that the Wi-Fi control module determines target channel information according to the channel information of the at least one packet includes: acquiring, by the Wi-Fi control module, the country code of the packet and using the acquired country code as the target channel information.

With reference to the second aspect or any one of the foregoing possible implementation manners, in a fourth possible implementation manner, the determining, by the Wi-Fi control module, a target country code according to the multiple country codes includes comparing, by the Wi-Fi control module, the multiple country codes; counting a quantity of same country codes; and when the quantity reaches a second set value, determining that the same country codes are the target country code.

With reference to the second aspect or any one of the foregoing possible implementation manners, in a fifth possible implementation manner, that the Wi-Fi control module controls, according to the target channel information, the Wi-Fi chip to perform Wi-Fi network access or provide a hotspot service for a user equipment includes searching for, by the Wi-Fi control module according to the target channel information, a pre-stored channel list corresponding to the target channel information in a pre-stored channel information list; and controlling, by the Wi-Fi control module according to the pre-stored channel list corresponding to the target channel information, the Wi-Fi chip to perform Wi-Fi network access or provide a hotspot service for a user equipment, where the pre-stored channel information list includes a one-to-one correspondence between a pre-stored country code and a pre-stored channel list, and the pre-stored channel information list includes at least one one-to-one correspondence.

With reference to the second aspect or any one of the foregoing possible implementation manners, in a sixth possible implementation manner, the pre-stored channel information list further includes a first correspondence between the pre-stored country code and a pre-stored interfered channel, and before the Wi-Fi control module controls, according to the target channel information, the Wi-Fi chip to perform Wi-Fi network access or provide a hotspot service for a user equipment, the Wi-Fi control module is configured to determine, by the Wi-Fi control module according to the target channel information and the first correspondence, an interfered channel corresponding to the target channel information, if the Wi-Fi control module determines that the Wi-Fi control module supports an interference processing feature, performing Wi-Fi network access or providing a hotspot service for a user equipment by using any channel of the pre-stored channel list or the acquired channel list of the channel information, or if the Wi-Fi control module determines that the Wi-Fi control module does not support an interference processing feature, performing Wi-Fi network access or providing a hotspot service for a user equipment by using an interference-free channel of the pre-stored channel list or the acquired channel list of the channel information, where the interference processing feature includes a dynamic frequency selection DFS feature or a TPC feature.

With reference to the second aspect or any one of the foregoing possible implementation manners, in a seventh possible implementation manner, after the Wi-Fi control module controls, according to the target channel information, the Wi-Fi chip to perform Wi-Fi network access or provide a hotspot service for a user equipment, the Wi-Fi controller further includes if the Wi-Fi control module determines that a currently used Wi-Fi network channel is interfered, and determines that the Wi-Fi device supports a DFS feature, controlling the Wi-Fi chip to switch to an interference-free channel to perform Wi-Fi network access or provide a hotspot service for a user equipment.

With reference to the second aspect or any one of the foregoing possible implementation manners, in an eighth possible implementation manner, after the Wi-Fi control module controls, according to the target channel information, the Wi-Fi chip to perform Wi-Fi network access or provide a hotspot service for a user equipment, the Wi-Fi controller further includes: if the Wi-Fi control module determines that a currently used Wi-Fi network channel is interfered, and determines that the Wi-Fi device supports a TPC feature, reducing transmit power of the Wi-Fi device.

With reference to the second aspect or any one of the foregoing possible implementation manners, in a ninth possible implementation manner, before the Wi-Fi control module controls, according to the target channel information, the Wi-Fi chip to perform Wi-Fi network access or provide a hotspot service for a user equipment, the Wi-Fi controller further includes: receiving, by the Wi-Fi control module, an update signal of an update channel, where the update signal is a roaming signal, an initial device use signal, a SIM/UIM card insertion signal, a timing signal, or a power-on signal.

According to a third aspect, a Wi-Fi device is provided, including a baseband chip and a Wi-Fi chip, where the baseband chip is connected to the Wi-Fi chip by using a data bus; the baseband chip controls the Wi-Fi chip to acquire at least one packet broadcasted by a second Wi-Fi device, where each packet includes channel information, the baseband chip determines target channel information according to the channel information of the at least one packet, and the baseband chip controls, according to the target channel information, the Wi-Fi chip to perform Wi-Fi network access or provide a hotspot service for a user equipment.

In a first possible implementation manner of the third aspect, the channel information includes a channel list and the at least one packet includes multiple packets, and that the baseband chip determines target channel information according to the channel information of the at least one packet includes acquiring, by the baseband chip, multiple channel lists of the multiple packets; and determining a target channel list according to the multiple channel lists and using the target channel list as the target channel information, or the at least one packet includes one packet and the channel information includes a channel list, and that the baseband chip determines target channel information according to the channel information of the at least one packet includes: acquiring, by the baseband chip, the channel list of the one packet and using the acquired channel list as the target channel information.

With reference to the third aspect or any one of the foregoing possible implementation manner, in a second possible implementation manner, the determining, by the baseband chip, a target channel list according to the multiple channel lists includes comparing, by the baseband chip, channels of the multiple channel lists; counting a quantity of channel lists having the same channel; and when the quantity reaches a first set value, determining that the channel lists having a same channel are the target channel list.

With reference to the third aspect or any one of the foregoing implementation manner, in a third possible implementation manner, the channel information includes a country code and the at least one packet includes multiple packets, and that the baseband chip determines target channel information according to the channel information of the at least one packet includes acquiring, by the baseband chip, multiple country codes of the multiple packets; and determining a target country code according to the multiple country codes and using the target country code as the target channel information, or the at least one packet includes one packet and the channel information includes a country code; and that the baseband chip determines target channel information according to the channel information of the at least one packet includes: acquiring, by the baseband chip, the country code of the packet and using the acquired country code as the target channel information.

With reference to the third aspect or any one of the foregoing possible implementation manner, in a fourth possible implementation manner, the determining, by the baseband chip, a target country code according to the multiple country codes includes comparing, by the baseband chip, the multiple country codes; counting a quantity of same country codes; and when the quantity reaches a second set value, determining that the same country codes are the target country code.

With reference to the third aspect or any one of the foregoing possible implementation manner, in a fifth possible implementation manner, that the baseband chip controls, according to the target channel information, the Wi-Fi chip to perform Wi-Fi network access or provide a hotspot service for a user equipment includes searching for, by the baseband chip according to the target channel information, a pre-stored channel list corresponding to the target channel information in a pre-stored channel information list; and controlling, by the baseband chip according to the pre-stored channel list corresponding to the target channel information, the Wi-Fi chip to perform Wi-Fi network access or provide a hotspot service for a user equipment, where the pre-stored channel information list includes a one-to-one correspondence between a pre-stored country code and a pre-stored channel list, and the pre-stored channel information list includes at least one one-to-one correspondence.

With reference to the third aspect or any one of the foregoing possible implementation manner, in a sixth possible implementation manner, the pre-stored channel information list further includes a first correspondence between the pre-stored country code and a pre-stored interfered channel, and before the baseband chip controls, according to the target channel information, the Wi-Fi chip to perform Wi-Fi network access or provide a hotspot service for a user equipment, the baseband chip determines, according to the target channel information and the first correspondence, an interfered channel corresponding to the target channel information, if the baseband chip determines that the baseband chip supports an interference processing feature, the baseband chip performs Wi-Fi network access or provides a hotspot service for a user equipment by using any channel of the pre-stored channel list or the acquired channel list of the channel information, or if the baseband chip determines that the baseband chip does not support an interference processing feature, the baseband chip performs Wi-Fi network access or provides a hotspot service for a user equipment by using an interference-free channel of the pre-stored channel list or the acquired channel list of the channel information, where the interference processing feature includes a DFS feature or a TPC feature.

With reference to the third aspect or any one of the foregoing possible implementation manner, in a seventh possible implementation manner, after the baseband chip controls, according to the target channel information, the Wi-Fi chip to perform Wi-Fi network access or provide a hotspot service for a user equipment, if the baseband chip determines that a currently used Wi-Fi network channel is interfered, and determines that the Wi-Fi device supports a dynamic frequency selection DFS feature, the baseband chip controls the Wi-Fi chip to switch to an interference-free channel to perform Wi-Fi network access or provide a hotspot service for a user equipment.

With reference to the third aspect or any one of the foregoing possible implementation manner, in an eighth possible implementation manner, after the baseband chip controls, according to the target channel information, the Wi-Fi chip to perform Wi-Fi network access or provide a hotspot service for a user equipment, the Wi-Fi device further includes: if the baseband chip determines that a currently used Wi-Fi network channel is interfered, and determines that the Wi-Fi device supports a TPC feature, reducing transmit power of the Wi-Fi device.

With reference to the third aspect or any one of the foregoing possible implementation manner, in a ninth possible implementation manner, before the baseband chip controls, according to the target channel information, the Wi-Fi chip to perform Wi-Fi network access or provide a hotspot service for a user equipment, the Wi-Fi device further includes: receiving, by the baseband chip, an update signal of an update channel, where the update signal is a roaming signal, an initial device use signal, a SIM/UIM card insertion signal, a timing signal, or a power-on signal.

Compared with the, any technical solution of the foregoing technical solutions provided in the present disclosure has the following advantage: before a Wi-Fi network is used, a packet broadcasted by a second Wi-Fi device around a first Wi-Fi device is listened for to acquire channel information of a corresponding packet, where the channel information includes a country code and a channel list, so as to ensure that a country code and a channel list that are used meet a local communication requirement, so that the Wi-Fi device can perform normal network access.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
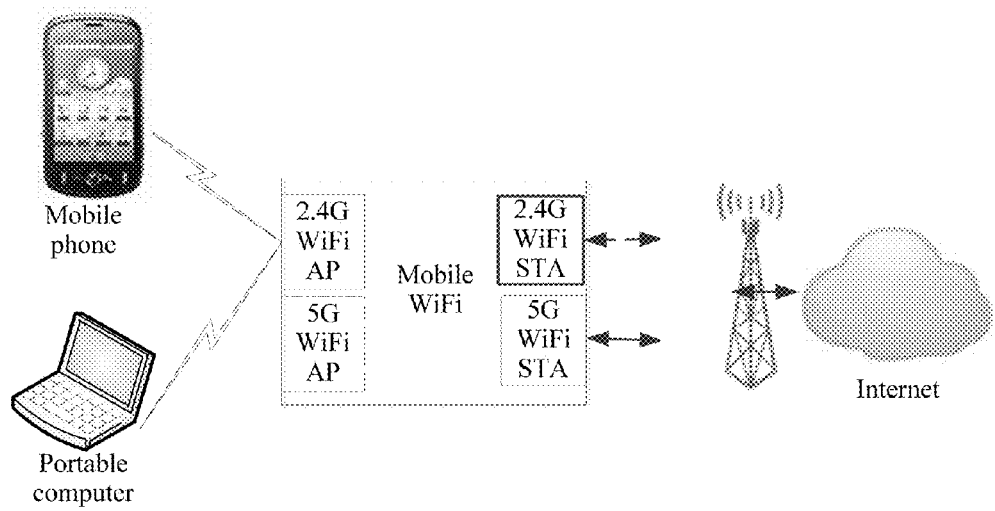
FIG. 1 is a diagram of an application scenario in which a Wi-Fi network is used according to an embodiment of the present disclosure.

FIG. 1 is an application scenario diagram of a Wi-Fi network connection method according to an embodiment of the present disclosure. A Wi-Fi device may serve as a station (STA) in an uplink direction to access a Wi-Fi network at a 2.4 gigahertz (GHz)/5 GHz frequency band or another frequency band; may serve as an access point (AP), that is, a hotspot, in a downlink direction, so that a Wi-Fi terminal at a 2.4 GHz/5 GHz or another frequency band may access the Internet by using the Wi-Fi device; and may also serve as a terminal that has an AP function. Therefore, a specific implementation manner of the Wi-Fi device may be a router, a Mobile Wi-Fi, a data card, or the like, or may be a terminal device such as a mobile phone or a PAD having a Wi-Fi function.

Figure 2:
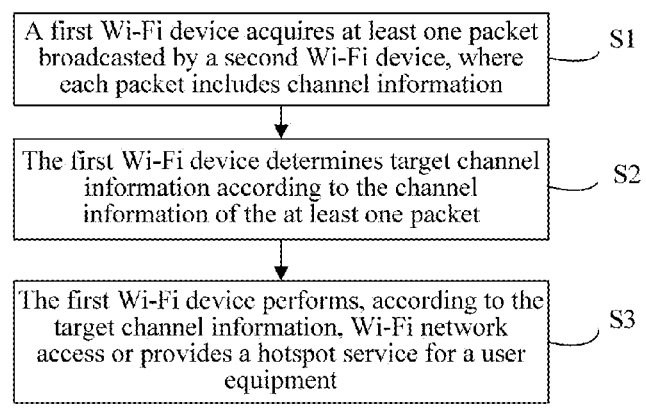
FIG. 2 is a flowchart of a Wi-Fi network connection method according to the embodiment of the present disclosure.

FIG. 2 shows a Wi-Fi network connection method, applied to a Wi-Fi device, and the method includes Si. A first Wi-Fi device acquires at least one packet broadcasted by a second Wi-Fi device, where each packet includes channel information.

A beacon packet or a probe response packet broadcasted by the second Wi-Fi device around the first Wi-Fi device may be listened for by the first Wi-Fi device. A position and a distance of the second Wi-Fi device around the first Wi-Fi device are not limited; as long as the packet broadcasted by the second Wi-Fi device can be received by the first Wi-Fi device, the second Wi-Fi device is within a listening scope of the first Wi-Fi device. Optionally, a beacon packet or a probe response packet broadcasted by a Wi-Fi device may also be listened for by a device except the Wi-Fi device. The device may listen for a packet broadcasted by a Wi-Fi device around the first Wi-Fi device and send the packet to the first Wi-Fi device, and may also listen for a packet broadcasted by a Wi-Fi device at another local position and send the packet to the first Wi-Fi device. The first Wi-Fi device may be a hotspot device, or may be a Wi-Fi device that has no hotspot function.

A quantity of times that the first Wi-Fi device acquires the at least one packet broadcasted by the second Wi-Fi device is at least one.

The channel information includes information such as a country code, a channel list corresponding to the country code, and maximum transmit power of each channel.

Optionally, the first Wi-Fi device in this embodiment of the present disclosure may activate step S1 or S2 by detecting UIM/SIM card insertion, roaming, initial use, and power-on of the first Wi-Fi device or by setting time; or a user may also configure a parameter of the Wi-Fi device, so as to activate step S1 or S2. In this embodiment of the present disclosure, an activation condition is not limited.

In this embodiment, UIM/SIM card insertion is used as an example to describe in detail an execution process of activating step S1; however, this embodiment of the present disclosure is not limited thereto.

Figure 3:
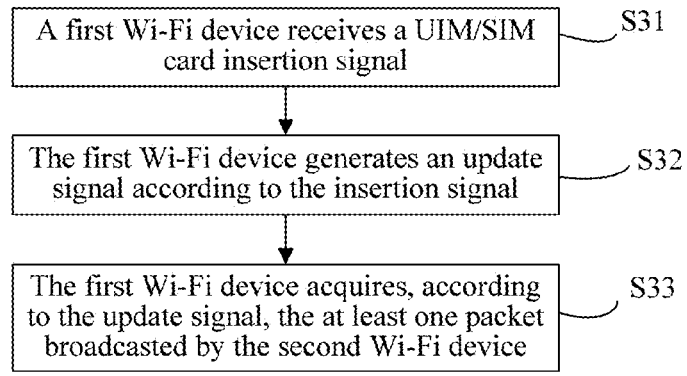
FIG. 3 is a flowchart in which a first Wi-Fi device activates the Wi-Fi network connection method according to the embodiment of the present disclosure.

When a UIM/SIM card is inserted into the first Wi-Fi device, steps shown in FIG. 3 are included S31. The first Wi-Fi device receives a UIM/SIM card insertion signal.

S32. The first Wi-Fi device generates an update signal according to the insertion signal.

S33. The first Wi-Fi device acquires, according to the update signal, the at least one packet broadcasted by the second Wi-Fi device.

The first Wi-Fi device may acquire channel information of all packets, and may also acquire channel information of some packets of all the packets.

For example, as shown in Table 1, the first Wi-Fi device acquires a packet in Japan, and channel information of the packet shown in Table 1 only lists a part of typical information.

TABLE 1

| Country Element ID (7) | Length (60) | Country code (JP) |
| --- | --- | --- |
| Starting Channel (36) | Number of Channels (1) | Max Tx Power (23) |
| Starting Channel (40) | Number of Channels (1) | Max Tx Power (23) |
| . . . | . . . | . . . |
| Starting Channel (140) | Number of Channels (1) | Max Tx Power (30) |

It may be understood that, in this embodiment of the present disclosure, the channel information of the packet acquired by the first Wi-Fi device may be acquired after the second Wi-Fi device is listened for set threshold times, and may also be acquired after the packet broadcasted by the second Wi-Fi device is listened for each time.

S2. The first Wi-Fi device determines target channel information according to the channel information of the at least one packet.

The channel information includes a channel list and the at least one packet includes multiple packets; and the determining target channel information according to the channel information of the at least one packet includes: acquiring multiple channel lists of the multiple packets; and determining a target channel list according to the multiple channel lists and using the target channel list as the target channel information; or the at least one packet includes one packet and the channel information includes a channel list; and the determining target channel information according to channel information of the at least one packet includes: acquiring the channel list of the one packet and using the acquired channel list as the target channel information.

Figure 4:
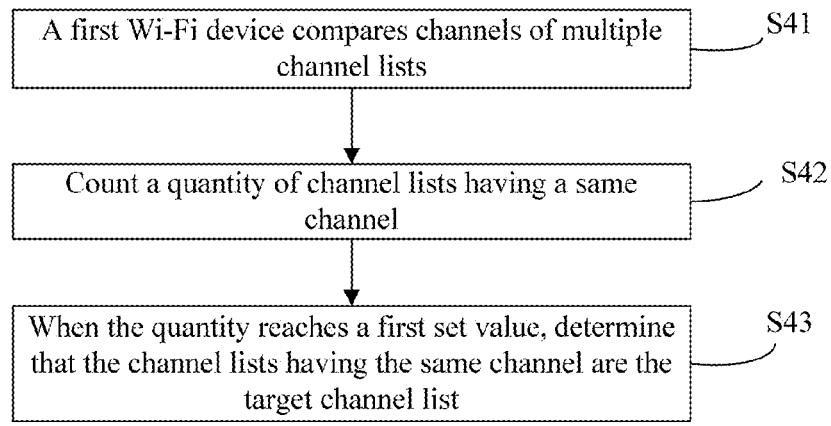
FIG. 4 is a flowchart in which the first Wi-Fi device determines a target channel list according to the embodiment of the present disclosure.

FIG. 4 is a flowchart in which the first Wi-Fi device determines the target channel list.

That the first Wi-Fi device determines a target channel list according to the multiple channel lists includes S41. The first Wi-Fi device compares channels of the multiple channel lists.

S42. Count a quantity of channel lists having the same channel.

S43. When the quantity reaches a first set value, determine that the channel lists having a same channel are the target channel list.

Optionally or further, if the first Wi-Fi device determines that the quantity does not reach the first set value, to improve accuracy of the target channel list, the first Wi-Fi device may continuously perform listening to acquire channel information of a new packet and perform determining until the quantity of channel lists having the same channel reaches the first set value.

Optionally or further, a first threshold may be set for a quantity of times for acquiring a packet.

When the quantity of times for acquiring a packet reaches the first threshold, and the quantity of channel lists having the same channel does not reach the first set value, it is considered that the first Wi-Fi device cannot determine the target channel list; the first Wi-Fi device cannot access the Wi-Fi network according to the target channel list; and the first Wi-Fi device may prompt the user that a network cannot be accessed or a hotspot service cannot be provided.

For example, in an example in which the first threshold for the quantity of times for listening performed by the first Wi-Fi device is 3, and packets broadcasted by 10 second Wi-Fi devices around are listened for the first time, the first Wi-Fi device determines that in the packets broadcasted by the 10 second Wi-Fi devices, if the quantity of channel lists having the same channel does not reach the first set value, for example, the first set value is 8, listening is performed for the second time, and it is determined whether the quantity of channel lists having the same channel in the second listening reaches the first set value. If no, listening continues. After the quantity of times for listening reaches a second set value for three times, if the quantity of channel lists having the same channel in the third listening still does not reach the first set value, a listening action stops and the user is prompted that a channel list cannot be acquired or a network cannot be accessed.

The first Wi-Fi device may update, according to the target channel list, a channel list pre-stored by the first Wi-Fi device, so that the first Wi-Fi device implements, according to the target channel list, at least one of performing Wi-Fi network access and providing a hotspot service; and there is no need to repeatedly perform the foregoing steps S1 and S2 each time.

Optionally, the first Wi-Fi device may further determine both a target country code and the target channel list, and update a pre-stored channel information list according to the target country code and the target channel list. The pre-stored channel information list includes a one-to-one correspondence between a pre-stored country code and the pre-stored channel list.

The updating a pre-stored channel information list according to the target country code and the target channel list includes: searching for a pre-stored channel list corresponding to the target country code in the pre-stored channel information list, and further updating the pre-stored channel list according to the target channel list.

The pre-stored channel information list is pre-stored in the first Wi-Fi device by a device manufacturer or an operator before the first Wi-Fi device is delivered from a factory. The pre-stored channel information list includes a one-to-one correspondence between a pre-stored country code of each country and a pre-stored channel list before the first Wi-Fi device is delivered from a factory, or the pre-stored channel information list is only a correspondence between a country code of a place in which the first Wi-Fi device is used and a channel list. The pre-stored channel information list may further include maximum transmit power allowed by each channel, a record of an interfered channel corresponding to each pre-stored country code, and the like.

Optionally, the channel information includes a country code and the at least one packet includes multiple packets; and that the first Wi-Fi device determines target channel information according to the channel information of the at least one packet includes: acquiring multiple country codes of the multiple packets, and determining a target country code according to the multiple country codes and using the target country code as the target channel information; or the at least one packet includes one packet and the channel information includes a country code; and the determining target channel information according to the channel information of the at least one packet includes: acquiring the country code of the packet and using the acquired country code as the target channel information.

Figure 5:
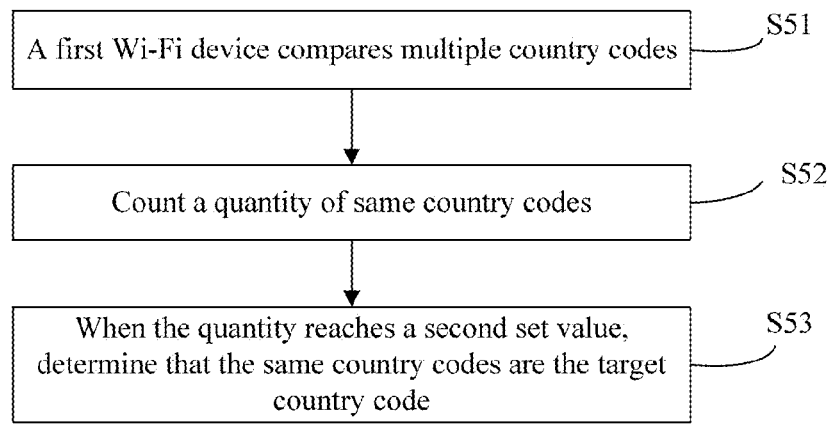
FIG. 5 is a flowchart in which the first Wi-Fi device determines a target country code according to the embodiment of the present disclosure.

FIG. 5 is a flowchart in which the first Wi-Fi device determines a target country code.

S51. The first Wi-Fi device compares the multiple country codes.

S52. Count a quantity of same country codes.

S53. When the quantity reaches a second set value, determine that the same country codes are the target country code.

S3. The first Wi-Fi device performs, according to the target channel information, Wi-Fi network access or provides a hotspot service for a user equipment.

When the target channel information is the target channel list, the Wi-Fi device may implement, according to the target channel list, at least one of performing Wi-Fi network access and providing a hotspot service.

Figure 6:
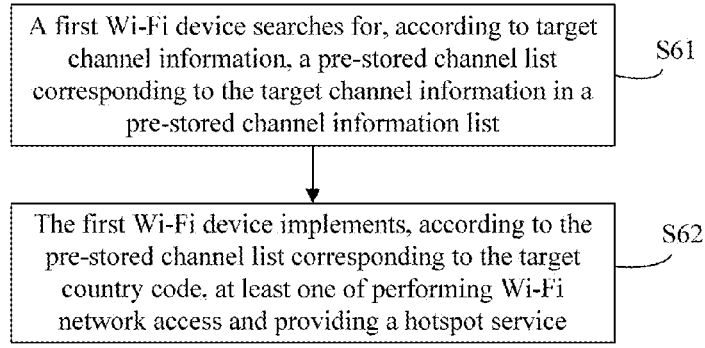
FIG. 6 is a flowchart in which the first Wi-Fi device performs Wi-Fi network access or provides a hotspot service for a user equipment according to the embodiment of the present disclosure.

Optionally, when the target channel information is the target country code, the step in which the first Wi-Fi device performs, according to the target channel information, Wi-Fi network access or provides a hotspot service for a user equipment is shown in FIG. 6.

S61. The first Wi-Fi device searches for, according to the target channel information, a pre-stored channel list corresponding to the target channel information in a pre-stored channel information list.

The first Wi-Fi device may search for, according to the target country code, the pre-stored channel list corresponding to the target country code in the pre-stored channel information list.

S62. The first Wi-Fi device implements, according to the pre-stored channel list corresponding to the target country code, at least one of performing Wi-Fi network access and providing a hotspot service.

According to the Wi-Fi network connection method provided in this embodiment of the present disclosure, according to an acquired packet broadcasted by a second Wi-Fi device around a first Wi-Fi device, the first Wi-Fi device can implement at least one of properly performing Wi-Fi network access and providing a hotspot service.

Figure 7:
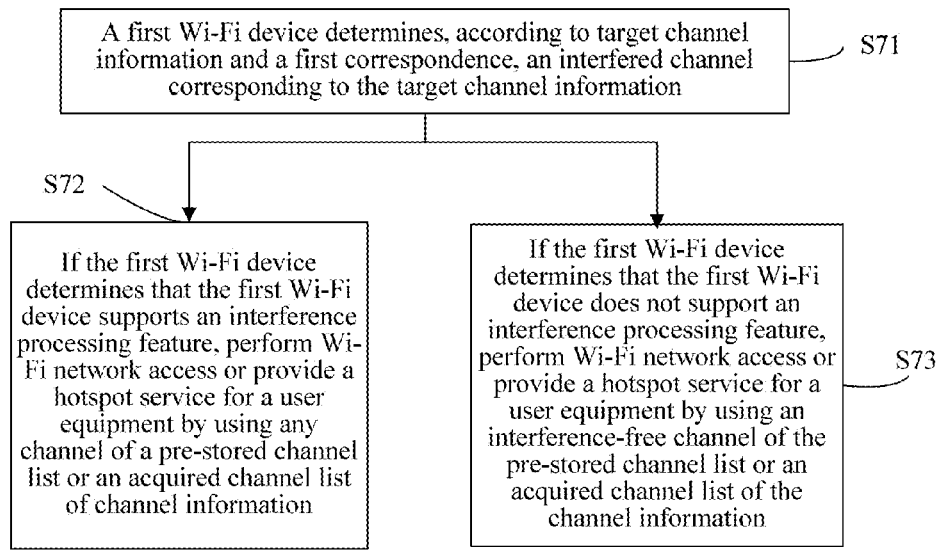
FIG. 7 is a flowchart of a method used by the first Wi-Fi device to use the Wi-Fi network according to another embodiment of the present disclosure.

FIG. 7 is a flowchart of a method used by the first Wi-Fi device to use a Wi-Fi network according to another embodiment of the present disclosure. This embodiment is a further extension based on the foregoing embodiment. In this embodiment, the pre-stored channel information list further includes a first correspondence between the pre-stored country code and a pre-stored interfered channel, and a second correspondence between the pre-stored country code and the pre-stored channel list, and the like, where the second correspondence is at least one one-to-one correspondence. According to the first correspondence and the second correspondence, the first Wi-Fi device may perform network access or provide a hotspot service by using an interference-free channel.

In the foregoing embodiment, before step S3 in which the first Wi-Fi device performs, according to the target channel information, Wi-Fi network access or provides a hotspot service for a user equipment, the following steps may be further included S71. The first Wi-Fi device determines, according to the target channel information and the first correspondence, an interfered channel corresponding to the target channel information.

S72. If the first Wi-Fi device determines that the first Wi-Fi device supports an interference processing feature, perform Wi-Fi network access or provide a hotspot service for a user equipment by using any channel of the pre-stored channel list or the acquired channel list of the channel information.

S73. If the first Wi-Fi device determines that the first Wi-Fi device does not support an interference processing feature, perform Wi-Fi network access or provide a hotspot service for a user equipment by using an interference-free channel of the pre-stored channel list or the acquired channel list of the channel information, where the interference processing feature includes a DFS feature or a TPC feature.

Certainly, the interference processing feature supported by the first Wi-Fi device may further include another function feature according to an actual situation, and this embodiment of the present disclosure is not limited to the foregoing two items.

Figure 8:
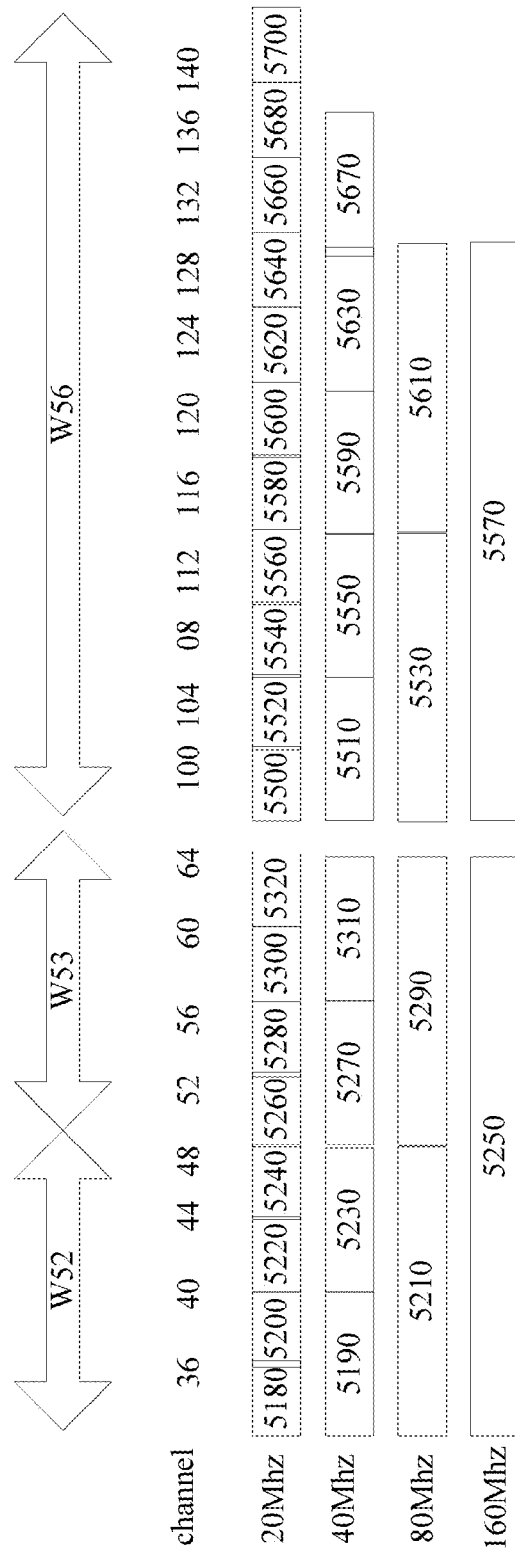
FIG. 8 is a schematic diagram of a channel list used when a first Wi-Fi device is used in Japan according to an embodiment of the present disclosure.

For example, when the Wi-Fi device roams to Japan to work, in channel information of three Wi-Fi devices acquired by the Wi-Fi device, country codes are all of Japan, and each of the channel lists is W52, W53, and W56 (shown in FIG. 8).

In an example in which a quantity of times that the Wi-Fi device acquires channel information is 1, in the three pieces of channel information acquired by the Wi-Fi device in this embodiment, the country codes are all of Japan, and the channel lists are all W52, W53, and W56, and therefore it may be determined that the foregoing acquired country codes and channel lists are the target country code and the target channel list.

The Wi-Fi device determines, according to the first correspondence, channels W53 and W56 may be interfered, and therefore the Wi-Fi device needs to support TPC and DFS functions. If the Wi-Fi device supports the TPC and DFS functions, channels W52, W53, and W56 are channels available for the Wi-Fi device, and the Wi-Fi device may perform Wi-Fi network access by using the channels W52, W53, and W56. The Wi-Fi device may first update the channel list of the pre-stored channel information list to include the channels W52, W53, and W56. If the first Wi-Fi device does not support the TPC and DFS functions, the channel W52 is selected as a channel available for the Wi-Fi device, and the channels W53 and W56 are defined as channels unavailable for the Wi-Fi device. Therefore, the channel list that is set by the Wi-Fi device is updated to include the channel W2 only. This can ensure that a channel used by the Wi-Fi device to perform communication meets a local communication requirement, thereby preventing impact on a radar.

Optionally, after that the first Wi-Fi device performs, according to the target channel information, Wi-Fi network access or provides a hotspot service for a user equipment, the method may further include if the first Wi-Fi device determines that a currently used Wi-Fi network channel is interfered, and determines that the first Wi-Fi device supports a dynamic frequency selection DFS feature, switching to an interference-free channel to perform Wi-Fi network access or provide a hotspot service for a user equipment.

If a Wi-Fi network channel currently used by the Wi-Fi device is within a range of a 5 GHz frequency band, a situation of frequency band reuse exists on some channels and radars, generating interference to a radar signal. If the first Wi-Fi device detects that an interfering signal exists or receives an interference instruction sent by a network hotspot, it is determined that the currently used channel is interfered.

Optionally, after that the first Wi-Fi device performs, according to the target channel information, Wi-Fi network access or provides a hotspot service for a user equipment, the method further includes if the first Wi-Fi device determines that a currently used Wi-Fi network channel is interfered, and determines that the first Wi-Fi device supports a transmit power control TPC feature, reducing transmit power of the first Wi-Fi device.

Optionally, after that the first Wi-Fi device performs, according to the target channel information, Wi-Fi network access or provides a hotspot service for a user equipment, the method further includes if the first Wi-Fi device determines that a currently used Wi-Fi network channel is interfered, and determines that the first Wi-Fi device does not support an interference processing feature, prompting a user to manually configure the channel or disconnect a Wi-Fi network, where the interference processing feature includes a dynamic frequency selection DFS feature or a transmit power control TPC feature.

If a Wi-Fi network channel currently used by the Wi-Fi device is within a range of a 5 GHz frequency band, a situation of frequency band reuse exists on some channels and radars, generating interference to a radar signal. If the first Wi-Fi device detects that an interfering signal exists or receives an interference instruction sent by a network hotspot, it is determined that the currently used channel is interfered.

If the first Wi-Fi device determines that the currently used Wi-Fi network channel is interfered, and the Wi-Fi device does not support the interference processing feature, a current Wi-Fi network may be disconnected, so as to ensure that the radar signal is not interfered and record the interfered channel. The Wi-Fi device may automatically implement, by using an interference-free channel in the channel list, at least one of performing Wi-Fi network access and providing a hotspot service again. Optionally, the user may implement, by using the interference-free channel in the channel list that is acquired by manual selection, at least one of performing Wi-Fi network access and providing a hotspot service again.

Optionally, if the Wi-Fi device determines that the currently used Wi-Fi network channel is interfered, and the Wi-Fi device does not support the interference processing feature, the user may further be prompted to manually select an interference-free channel, so as to switch to the interference-free channel. In this way, user experience is not affected because the user is not forced to disconnect the network. The step of prompting the user to manually select an interference-free channel may include: displaying a prompt message indicating that the current channel is interfered, and displaying a channel list that is not interfered and may be manually selected by the user. A prompt manner in this embodiment is only an exemplary description, and a protection scope of the prompt manner is not limited. Another user prompt method that is applied to a solution of this embodiment of the present disclosure also falls within the protection scope of this embodiment of the present disclosure.

It may be understood that the Wi-Fi device may update a channel list on a STA side of the Wi-Fi device, and a channel list on an AP side of the Wi-Fi device and the channel list on the STA side may be synchronously updated.

According to the Wi-Fi network connection method provided in this embodiment of the present disclosure, when it is detected that a current channel of a Wi-Fi device is interfered, the Wi-Fi device switches to another channel, thereby preventing interference to a radar signal and violation of a local communication law.

Embodiment 2

Figure 9:
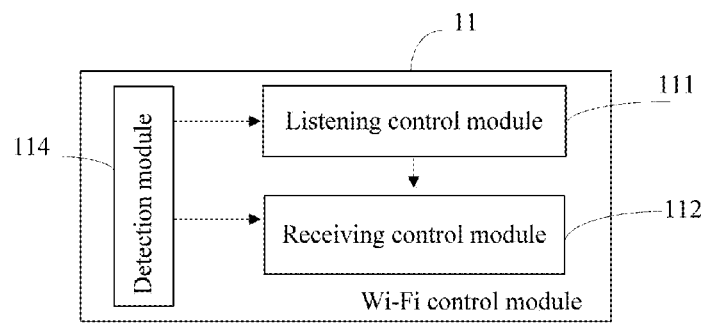
FIG. 9 is a schematic diagram of an architecture of a Wi-Fi controller according to another embodiment of the present disclosure.

FIG. 9 is a schematic diagram of an architecture of a Wi-Fi controller according to an embodiment of the present disclosure.

This embodiment of the present disclosure provides a Wi-Fi controller, where the Wi-Fi controller is applied to the foregoing Wi-Fi network connection method and may be disposed in a Wi-Fi device. The Wi-Fi controller can implement at least the Wi-Fi network connection method in Embodiment 1. The Wi-Fi controller includes a Wi-Fi control module 11, where the Wi-Fi control module is configured to control a Wi-Fi chip to acquire at least one packet broadcasted by a second Wi-Fi device, where each packet includes channel information; the Wi-Fi control module 11 determines target channel information according to the channel information of the at least one packet; and the Wi-Fi control module 11 controls, according to the target channel information, the Wi-Fi chip to perform Wi-Fi network access or provide a hotspot service for a user equipment.

According to the Wi-Fi controller provided in this embodiment of the present disclosure, the packet broadcasted by the second Wi-Fi device around is acquired, and local channel information is acquired, so that the Wi-Fi controller implements, according to the channel information, at least one of properly performing Wi-Fi network access and providing a hotspot service.

The Wi-Fi control module 11 may further include a listening control module 111, where the listening control module 111 can control the Wi-Fi chip to listen for a beacon packet or a probe response packet broadcasted by the second Wi-Fi device around the Wi-Fi device. A position and a distance of the second Wi-Fi device around the Wi-Fi device are not limited; as long as the packet broadcasted by the second Wi-Fi device can be received by the Wi-Fi controller, the second Wi-Fi device is within a listening scope of the Wi-Fi controller.

Optionally, the Wi-Fi control module 11 may further include a receiving control module 112, where the receiving control module 112 can control the Wi-Fi chip or a radio frequency component to receive a beacon packet or a probe response packet listened for by another device expect the Wi-Fi device.

The Wi-Fi control module 11 acquires at least one packet broadcasted by at least one Wi-Fi device, and a quantity of times for acquiring the packet broadcasted by the at least one Wi-Fi device is at least one.

The Wi-Fi control module 11 in this embodiment of the present disclosure may include a detection module 114, and the detection module 114 enables a function of acquiring a packet broadcasted by the Wi-Fi device when detecting UIM/SIM card insertion, roaming, initial use, power-on, or time setting for the Wi-Fi device, or when detecting that a user configures a parameter of the Wi-Fi device.

In this embodiment, UIM/SIM card insertion is used as an example. When the detection module 114 detects that a UIM/SIM card is inserted into the Wi-Fi device, the detection module 114 detects an insertion signal indicating that a user inserts the UIM/SIM card, and initiates an update message according to the insertion signal to the listening control module 111, where the update message is used to instruct the listening control module 111 to acquire a packet broadcasted by a local Wi-Fi device.

The listening control module 111 may acquire channel information of all listened packets, and may also acquire channel information of some packets of all the packets. The channel information includes information such as a country code, a channel list corresponding to the country code, and maximum transmit power of each channel.

It may be understood that the Wi-Fi control module 11 may implement, according to a channel list of the channel information, at least one of performing Wi-Fi network access and providing a hotspot service.

The Wi-Fi control module 11 may directly control, according to one acquired channel list of the channel information, the Wi-Fi chip to implement at least one of performing Wi-Fi network access and providing a hotspot service. The Wi-Fi control module 11 may also determine a target channel list according to multiple acquired channel lists of the channel information, and control, according to the target channel list, the Wi-Fi chip to implement at least one of performing Wi-Fi network access and providing a hotspot service.

The channel information includes a channel list and the at least one packet includes multiple packets, and that the Wi-Fi control module determines target channel information according to the channel information of the at least one packet includes: acquiring, by the Wi-Fi control module 11, multiple channel lists of the multiple packets; and determining a target channel list according to the multiple channel lists and using the target channel list as the target channel information, or the at least one packet includes one packet and the channel information includes a channel list, and that the Wi-Fi control module determines target channel information according to the channel information of the at least one packet includes: acquiring, by the Wi-Fi control module, the channel list of the one packet and using the acquired channel list as the target channel information.

That the Wi-Fi control module determines a target channel list according to the multiple channel lists includes: comparing, by the Wi-Fi control module, channels of the multiple channel lists; counting a quantity of channel lists having the same channel; and when the quantity reaches a first set value, determining that the channel lists having a same channel are the target channel list. If it is determined that the quantity does not reach the first set value, to improve accuracy of the target channel list, the Wi-Fi control module 11 may repeatedly acquire channel information of the second Wi-Fi device for multiple times, and the Wi-Fi control module 11 determines the target channel list according to the at least one channel list of the second Wi-Fi device that is acquired for multiple times.

Optionally or further, a threshold may be set for the quantity of times that the Wi-Fi control module 11 acquires the channel information of the second Wi-Fi device. When the quantity of acquiring times reaches the set threshold, and the Wi-Fi control module 11 determines that the quantity of channel lists having the same channel does not reach the first set value, it is considered that the Wi-Fi controller cannot determine the target channel list and cannot access a network according to the target channel list, and the Wi-Fi control module 11 may prompt the user that the network cannot be accessed or the hotspot service cannot be provided.

Optionally or further, the Wi-Fi control module 11 may control, according to a country code of the channel information and a pre-stored channel information list, the Wi-Fi chip to implement at least one of performing Wi-Fi network access and providing a hotspot service. The pre-stored channel information list is pre-stored in a Wi-Fi device by a device manufacturer or an operator before the Wi-Fi device is delivered from a factory, where the Wi-Fi controller is disposed in the Wi-Fi device. The pre-stored channel information list includes a one-to-one correspondence between a country code of each country and a channel list before the Wi-Fi device is delivered from a factory, or the pre-stored channel information list is only a correspondence between a country code of a place in which the Wi-Fi device is used and a channel list. The pre-stored channel information list may further include maximum transmit power allowed by each channel, a record of an interfered channel of each country, and the like. When the target channel information is the target country code, that the Wi-Fi control module 11 controls, according to the target channel information, the Wi-Fi chip to perform Wi-Fi network access or provide a hotspot service for a user equipment includes searching for, by the Wi-Fi control module 11 according to the target channel information, a pre-stored channel list corresponding to the target channel information in a pre-stored channel information list; and controlling, by the Wi-Fi control module 11 according to the pre-stored channel list corresponding to the target channel information, the Wi-Fi chip to perform Wi-Fi network access or provide a hotspot service for a user equipment.

The Wi-Fi control module 11 may search for, according to one country code of the channel information, a target channel list corresponding to the country code in the pre-stored channel information list. The Wi-Fi control module 11 may further determine the target country code according to multiple country codes of the channel information, and search for the target channel list corresponding to the target country code in the pre-stored channel information list. The Wi-Fi control module 11 controls, according to the target channel list, the Wi-Fi chip to implement at least one of performing Wi-Fi network access and providing a hotspot service.

It may be understood that, a method in which the Wi-Fi control module 11 determines the target country code is similar to a method in which the Wi-Fi control module 11 determines the target channel list according to the multiple channel lists of the channel information in the foregoing embodiment, and details are not described herein again.

Optionally or further, before the Wi-Fi control module 11 controls the Wi-Fi chip to perform Wi-Fi network access or provide a hotspot service for a user equipment, the Wi-Fi device further includes determining, by the Wi-Fi control module 11 according to the target channel information and the first correspondence, an interfered channel corresponding to the target channel information, if the Wi-Fi control module 11 determines that the Wi-Fi control module supports an interference processing feature, performing Wi-Fi network access or providing a hotspot service for a user equipment by using any channel of the pre-stored channel list or the acquired channel list of the channel information, or if the Wi-Fi control module 11 determines that the Wi-Fi control module does not support an interference processing feature, performing Wi-Fi network access or providing a hotspot service for a user equipment by using an interference-free channel of the pre-stored channel list or the acquired channel list of the channel information, where the interference processing feature supported by the Wi-Fi device generally includes a DFS function, or may also include a TPC function. Certainly, the interference processing feature supported by the Wi-Fi device may further include another function or feature according to an actual situation, and this embodiment of the present disclosure is not limited to the foregoing two items.

The Wi-Fi control module 11 in this embodiment of the present disclosure may further update, according to the determined target channel list, the pre-stored channel list that is pre-stored by the Wi-Fi device, so that the Wi-Fi device implements, according to the target channel list, at least one of performing Wi-Fi network access and providing a hotspot service repeatedly.

The Wi-Fi control module 11 may also update, according to the determined target country code and target channel list, the pre-stored country code and the pre-stored channel list that are pre-stored by the Wi-Fi device.

The Wi-Fi control module 11 may also update a channel list on a STA side of the Wi-Fi device, and a channel list on an AP side of the Wi-Fi device and the channel list on the STA side may also be synchronously updated.

Optionally or further, the Wi-Fi control module 11 may further prompt, according to an update success message, the user that updating succeeds. The prompting the user that updating succeeds may be controlling a display screen to display the update success message, where the update success message may carry a currently used channel.

The Wi-Fi control module 11 prompts, according to an update failure message, the user that the updating fails, and prompts the user to use a set channel list to attempt to implement at least one of accessing a network and providing a hotspot service.

Optionally or further, the Wi-Fi control module 11 may be further configured to detect whether the currently used Wi-Fi network channel is interfered; if it is determined that interference exists, and it is determined that the Wi-Fi device supports the interference processing feature, send a frequency hopping signal to the Wi-Fi chip so that the Wi-Fi chip switches to an interference-free channel to perform Wi-Fi network access or provide a network for a user, where the Wi-Fi chip may switch to an interference-free channel in the preset channel list, and may also switch to an interference-free channel in the acquired channel list. Optionally, if the Wi-Fi control module determines that the currently used Wi-Fi network channel is interfered, and determines that the Wi-Fi device supports a TPC feature, transmit power of the Wi-Fi device is reduced.

If the Wi-Fi control module 11 determines that the Wi-Fi device does not support the interference processing feature, the Wi-Fi chip is controlled to disconnect the Wi-Fi network and reselect an interference-free channel to implement at least one of performing Wi-Fi network access and providing a hotspot service, or prompt the user to manually select an interference-free channel to implement at least one of performing Wi-Fi network access and providing a hotspot service. For a specific prompt method, reference may be made to specific content of the method embodiment.

It may be understood that the Wi-Fi control module may record an interfered channel, and when the Wi-Fi device does not support an interference processing feature, the interfered channel is not used, thereby preventing the Wi-Fi device from generating interference to a radar signal and violating a local communication law.

Embodiment 3

Figure 10:
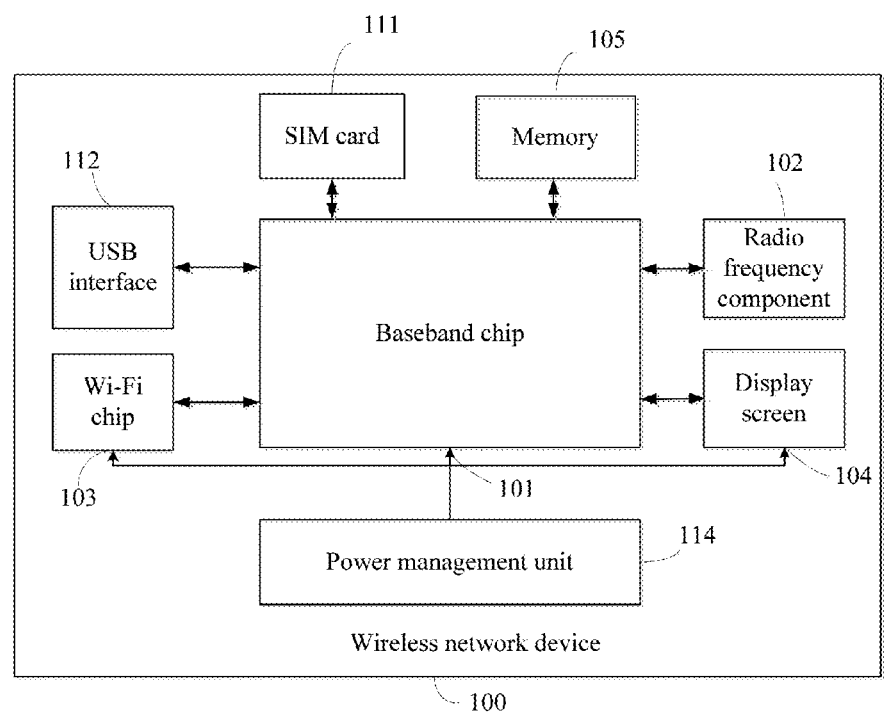
FIG. 10 is a schematic diagram of a hardware architecture of a Wi-Fi device according to yet another embodiment of the present disclosure.

FIG. 10 is a diagram of a hardware architecture of a Wi-Fi device according to an embodiment of the present disclosure.

A Wi-Fi device 100 in this embodiment is applied to the Wi-Fi network connection method in Embodiment 1, and the Wi-Fi device 100 may implement at least a function of the Wi-Fi network connection method in the foregoing Embodiment 1.

The Wi-Fi device 100 includes a baseband chip 101, a Wi-Fi chip 103, and a radio frequency component 102, where the baseband chip 101 is connected to the Wi-Fi chip 103 and the radio frequency component 102 by using a data bus.

The baseband chip controls the Wi-Fi chip 103 to acquire at least one packet broadcasted by a second Wi-Fi device, where each packet includes channel information; the baseband chip 101 determines target channel information according to the channel information of the at least one packet; and the baseband chip controls, according to the target channel information, the Wi-Fi chip 103 to perform Wi-Fi network access or provide a hotspot service for a user equipment.

According to the baseband chip provided in this embodiment of the present disclosure, a packet broadcasted by a Wi-Fi device around the Wi-Fi device 100 is acquired, and local channel information is acquired, so that the Wi-Fi device 100 implements, according to the channel information, at least one of properly performing Wi-Fi network access and providing a hotspot service.

The baseband chip 101 may further control the Wi-Fi chip to listen for a beacon packet or a probe response packet broadcasted by a Wi-Fi device around the Wi-Fi device 100. A position and a distance of the Wi-Fi device around the Wi-Fi device 100 are not limited; as long as the packet broadcasted by the Wi-Fi device can be received by the Wi-Fi device 100, the Wi-Fi device is within a listening scope of the Wi-Fi device 100.

Optionally, the baseband chip 101 may further control the Wi-Fi chip 103 or the radio frequency component 102 to receive a beacon packet or a probe response packet that is broadcasted by a Wi-Fi device and listened for by another device except the Wi-Fi device. The first Wi-Fi device may be a Wi-Fi hotspot device, and may also be a Wi-Fi device that has no hotspot function.

The baseband chip 101 controls the Wi-Fi chip 103 to acquire the at least one packet broadcasted by the at least one Wi-Fi device, and a quantity of times for acquiring the packet broadcasted by the at least one Wi-Fi device is at least one.

The baseband chip 101 of the Wi-Fi device in this embodiment of the present disclosure may further control, when detecting UIM/SIM card 111 insertion, roaming, initial use, power-on, or time setting for the Wi-Fi device, or when detecting that a user configures a parameter of the Wi-Fi device, the Wi-Fi chip 103 to acquire the packet broadcasted by the at least one Wi-Fi device.

In this embodiment, UIM/SIM card insertion is used as an example. The baseband chip 101 receives an insertion signal indicating that a user inserts the UIM/SIM card 111, and controls, according to the insertion signal, the Wi-Fi chip to acquire a packet broadcasted by at least one local Wi-Fi device.

The baseband chip 101 may acquire each packet, so as to acquire channel information of each packet, and may also acquire channel information of some packets of the packets. The channel information includes information such as a country code, a channel list corresponding to the country code, and maximum transmit power of each channel.

The baseband chip 101 may implement, according to the channel list of the channel information, at least one of performing Wi-Fi network access and providing a hotspot service.

The baseband chip 101 may directly control, according to one acquired channel list of the channel information, the Wi-Fi chip 103 to implement at least one of performing Wi-Fi network access and providing a hotspot service. The Wi-Fi control module 11 may also determine a target channel list according to multiple acquired channel lists of the channel information, and control, according to the target channel list, the Wi-Fi chip 103 to implement at least one of performing Wi-Fi network access and providing a hotspot service.

When the multiple channel lists of the channel information are acquired, the baseband chip 101 compares channels of the acquired channel lists, counts the quantity of channel lists having the same channel; and if it is determined that the quantity reaches a first set value, determines that the channel lists having a same channel are the target channel list. If it is determined that the quantity does not reach the first set value, to improve accuracy of the target channel list, the baseband chip 101 may instruct the Wi-Fi chip 103 to repeatedly acquire the channel information of the first Wi-Fi device for multiple times, and the baseband chip 101 determines the target channel list according to the channel list of the at least one Wi-Fi device that is acquired for multiple times.

Optionally or further, a threshold may be set for the quantity of times that the Wi-Fi chip 103 acquires the channel information of the first Wi-Fi device. When the quantity of acquiring times reaches the set threshold, and the baseband chip 101 determines that the quantity of channel lists having the same channel does not reach the first set value, it is considered that the Wi-Fi device cannot determine the target channel list and cannot access a network according to the target channel list, and the baseband chip 101 may control a display screen to display a prompt message, so as to prompt the user that the network cannot be accessed or the hotspot service cannot be provided.

Optionally or further, the baseband chip 101 may control, according to a country code of the channel information and a pre-stored channel information list, the Wi-Fi chip 103 to implement at least one of performing Wi-Fi network access and providing a hotspot service. The pre-stored channel information list is pre-stored in the Wi-Fi device by a device manufacturer or an operator before the Wi-Fi device is delivered from a factory. The pre-stored channel information list includes a one-to-one correspondence between a country code of each country and a channel list before the Wi-Fi device is delivered from a factory, or the pre-stored channel information list is only a correspondence between a country code of a place in which the Wi-Fi device is used and a channel list. The pre-stored channel information list may further include maximum transmit power allowed by each channel, a record of an interfered channel of each country, and the like.

The baseband chip 101 searches for, according to the country code of the channel information, a target channel list corresponding to the country code in the pre-stored channel information list.

The baseband chip 101 may search for, according to one country code of the channel information, a target channel list corresponding to the country code in the pre-stored channel information list. The baseband chip 101 may further determine the target country code according to multiple country codes of the channel information, and search for the target channel list corresponding to the target country code in the pre-stored channel information list. The baseband chip 101 controls, according to the target channel list, the Wi-Fi chip 103 to implement at least one of performing Wi-Fi network access and providing a hotspot service.

It may be understood that, a method in which the baseband chip 101 determines the target country code is similar to a method in which the baseband chip 101 determines the target channel list according to the multiple channel lists of the channel information in the foregoing embodiment, and details are not described herein again.

The Wi-Fi device 100 in this embodiment of the present disclosure may further include a display screen 104 and a memory 105. The memory 105 pre-stores set channel information and updates the channel information acquired by the memory, so that the Wi-Fi device implements, according to the target channel list, at least one of performing Wi-Fi network access and providing a hotspot service repeatedly.

The baseband chip 101 may update a channel list on a STA side of the Wi-Fi device, and a channel list on an AP side of the Wi-Fi device and the channel list on the STA side may also be synchronously updated.

Optionally or further, the baseband chip 101 may further control the display screen 104 to display an update success message to prompt the user that updating succeeds, where the update success message may carry a currently used channel.

The baseband chip 101 may further control the display screen 104 to display an update failure message to prompt the user that the updating fails, and prompt the user to use a set channel list to attempt to implement at least one of accessing a network and providing a hotspot service.

Optionally or further, the baseband chip 101 may further detect, according to a signal received by the Wi-Fi chip 103, whether the currently used Wi-Fi network channel is interfered, and the baseband chip 101 determines whether the Wi-Fi device supports an interference processing feature. If it is determined that interference exists and a DFS feature is supported, a frequency hopping signal is sent to the Wi-Fi chip 103, and the Wi-Fi chip 103 switches to an interference-free channel, where the Wi-Fi chip may switch to an interference-free channel in the preset channel list, and may also switch to an interference-free channel in the acquired channel list.

Optionally, if the baseband chip determines that the currently used Wi-Fi network channel is interfered, and determines that the Wi-Fi device supports a TPC feature, transmit power of the Wi-Fi device is reduced.

If the baseband chip 101 detects that the currently used Wi-Fi network channel is interfered, and determines that the Wi-Fi device does not support the interference processing feature, the Wi-Fi chip is controlled to disconnect the Wi-Fi network and reselect an interference-free channel to implement at least one of performing Wi-Fi network access and providing a hotspot service, or prompt the user to manually select an interference-free channel to implement at least one of performing Wi-Fi network access and providing a hotspot service. For a specific prompt method, reference may be made to specific content of the foregoing embodiment.

The interference processing feature supported by the Wi-Fi device generally includes a DFS function, and may also include a TPC function. Certainly, the interference processing feature supported by the Wi-Fi device may further include another function or feature according to an actual situation, and this embodiment of the present disclosure is not limited to the foregoing two items.

It may be understood that the baseband chip may record an interfered channel, and when the Wi-Fi device does not support the interference processing feature, the interfered channel is not used.

Optionally, the pre-stored channel information list further includes a first correspondence between a pre-stored country code and a pre-stored interfered channel. When the target channel information is the target country code, the baseband chip 101 determines, according to the target channel information and the first correspondence, an interfered channel corresponding to the target channel information.

If the baseband chip 101 determines that the baseband chip 101 supports the interference processing feature, Wi-Fi network access is performed or a hotspot service is provided for a user equipment by using any channel of the pre-stored channel list or the acquired channel list of the channel information.

If the baseband chip 101 determines that the baseband chip 101 does not support the interference processing feature, Wi-Fi network access is performed or a hotspot service is provided for a user equipment by using an interference-free channel of the pre-stored channel list or the acquired channel list of the channel information.

It should be noted that the Wi-Fi device 100 may further include components such as a SIM card 111, a universal serial bus (USB) interface 112, and a power management unit 114. These components are separately connected to the baseband chip 101 by using a bus. It may be understood that components included in the Wi-Fi device 100 according to a requirement may be more than the foregoing components, or may also be less than the foregoing components, which is not limited in this embodiment of the present disclosure.

According to the Wi-Fi device provided in this embodiment of the present disclosure, when it is detected that a currently used channel of the Wi-Fi device is interfered, the Wi-Fi device switches to another channel or reduces transmit power, thereby preventing interference to a radar signal and violation of a local communication law.

It should be noted that, in combination with the steps of methods and modules described in the embodiments disclosed by the specification, implementation may be performed by using electronic hardware or a combination of computer software and hardware. The foregoing description already generally describes the steps and contents of each embodiment according to functions. Whether the functions are performed by hardware or software and hardware depends on particular applications and design constraint conditions of the technical solutions. A person of ordinary skill in the art may use different methods to implement the described functions for each particular application, but it should not be considered that the implementation goes beyond the scope of the present disclosure.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a compact disk read-only memory (CD-ROM), or any other form of storage medium known in the art.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless fidelity (Wi-Fi) network connection method, comprising:
    acquiring, by a first Wi-Fi device, at least one packet broadcasted by a second Wi-Fi device, wherein each of the at least one packet comprises channel information comprising a country code;
    determining, by the first Wi-Fi device, target channel information based on the channel information of the at least one packet; and
    performing, by the first Wi-Fi device based on the target channel information, Wi-Fi network access; or providing a hotspot service for a user equipment,
    wherein, when the at least one packet comprises a plurality of packets, determining the target channel information comprises:
        acquiring a plurality of country codes from the plurality of packets;
        determining a target country code based on the plurality of country codes; and using the target country code as the target channel information,
wherein, when the at least on packet comprises only one packet, determining the target channel information comprises:
acquiring a country code from the packet; and
using the country code as the target channel information,
wherein, determining the target country code based on the plurality of country codes comprises:
comparing the plurality of country codes;
counting a quantity of a same country code; and
determining that the same country code is the target country code when the quantity of the same country code reaches a set value.

2. The Wi-Fi network connection method of claim 1, wherein performing the Wi-Fi network access or providing the hotspot service for the user equipment comprises:
searching, by the first Wi-Fi device based on the target channel information, for a pre-stored channel list corresponding to the target channel information in a pre-stored channel information list; and
performing, by the first Wi-Fi device based on the pre-stored channel list corresponding to the target channel information, the Wi-Fi network access; or
providing the hotspot service for the user equipment, wherein the pre-stored channel information list comprises at least one one-to-one correspondence between a pre-stored country code and a pre-stored channel list.

3. The Wi-Fi network connection method of claim 2, wherein the pre-stored channel information list further comprises:
a first correspondence between the pre-stored country code; and
a pre-stored interfered channel, and wherein before performing the Wi-Fi network access or the providing the hotspot service for the user equipment, the method further comprises:
determining, by the first Wi-Fi device based on the target channel information and the first correspondence, an interfered channel corresponding to the target channel information;
performing the Wi-Fi network access or providing the hotspot service for the user equipment by using any channel of the pre-stored channel list or an acquired channel list of the channel information when the first Wi-Fi device determines that the first Wi-Fi device supports an interference processing feature; or
performing Wi-Fi network access or providing the hotspot service for the user equipment by using an interference-free channel of the pre-stored channel list or the acquired channel list of the channel information when the first Wi-Fi device determines that the first Wi-Fi device does not support an interference processing feature, wherein the interference processing feature comprises a dynamic frequency selection (DFS) feature or a transmit power control (TPC) feature.

4. The Wi-Fi network connection method of claim 1, wherein after performing the Wi-Fi network access or providing the hotspot service for the user equipment, the method further comprises:
determining that a currently used Wi-Fi network channel is interfered;
determining that the first Wi-Fi device supports a dynamic frequency selection (DFS) feature; and
switching to an interference-free channel to perform the Wi-Fi network access or provide the hotspot service for the user equipment.

5. The Wi-Fi network connection method of claim 1, wherein after performing the Wi-Fi network access or providing the hotspot service for the user equipment, the method further comprises:
determining that a currently used Wi-Fi network channel is interfered;
determining that the first Wi-Fi device supports a transmit power control(TPC) feature; and
reducing transmit power of the first Wi-Fi device.

6. The Wi-Fi network connection method of claim 1, wherein after performing the Wi-Fi network access or providing the hotspot service for the user equipment, the method further comprises:
determining that a currently used Wi-Fi network channel is interfered;
determining that the first Wi-Fi device does not support a dynamic frequency selection (DFS) feature or a transmit power control (TPC) feature; and
prompting a user to manually configure a channel or disconnect a Wi-Fi network.

7. The Wi-Fi network connection method of claim 1, wherein before determining the target channel information the method further comprises receiving, by the first Wi-Fi device, an update signal of an update channel, wherein the update signal is one of a roaming signal, an initial device use signal, a subscriber identity module (SIM)/User Identity Module (UIM) card insertion signal, a timing signal, and a power-on signal.

8. A wireless fidelity (Wi-Fi) device comprising:
a Wi-Fi chip; and
a baseband chip, wherein the baseband chip is connected to the Wi-Fi chip by using a data bus, and wherein the baseband chip is configured to:
control the Wi-Fi chip to acquire at least one packet broadcasted by a second Wi-Fi device, wherein each of the at least one packet comprises channel information comprising a country code;
determine target channel information based on the channel information of the at least one packet; and
control, based on the target channel information, to Wi-Fi chip to perform Wi-Fi network access or provide a hotspot service for a user equipment,
wherein when the at least one packet comprise a plurality of packets, determining the target channel information comprises:
acquiring, by the baseband chip, a plurality of country codes from the plurality of packets;
determining, by the baseband chip, a target country code based on the plurality of country codes; and
using the target country code as the target channel information,
wherein, when the at least one packet comprises only one, packet, determining the target channel information comprises:
acquiring, by the baseband chip, a country code from the packet; and
using, by the baseband chip, the country code as the target channel information,
wherein, determining the target country code base on the plurality of country codes comprises:
comparing, by the baseband chip, the plurality of country codes:
counting a quantity of the same country code; and determining that the same country code is the target country code when the quantity of the same country code reaches a set value.

9. The Wi-Fi device of claim 8, wherein controlling the Wi-Fi chip to perform the Wi-Fi network access or provide the hotspot service for the user equipment comprises:
searching, by the baseband chip based on the target channel information, for a pre-stored channel list corresponding to the target channel information in a pre-stored channel information list; and
controlling, by the baseband chip based on the pre-stored channel list corresponding to the target channel information, the Wi-Fi chip to perform the Wi-Fi network access or provide the hotspot service for the user equipment, wherein the pre-stored channel information list comprises at least one one-to-one correspondence between a pre-stored country code and a pre-stored channel list.

10. The Wi-Fi device of claim 9, wherein the pre-stored channel information list further comprises:
a first correspondence between the pre-stored country code; and
a pre-stored interfered channel,
wherein before controlling, the Wi-Fi chip to perform the Wi-Fi network access or provide the hotspot service for the user equipment, the baseband chip is further configured to:
determine, based on the target channel information and the first correspondence, an interfered channel corresponding to the target channel information;
perform the Wi-Fi network access or provide the hotspot service for the user equipment by using any channel of the pre-stored channel list or an acquired channel list of the channel information when the baseband chip determines that the baseband chip supports an interference processing feature; and
perform the Wi-Fi network access or provides the hotspot service for the user equipment by using an interference-free channel of the pre-stored channel list or the acquired channel list of the channel information when the baseband chip determines that the baseband chip does not support the interference processing feature, wherein the interference processing feature comprises a dynamic frequency selection (DFS) feature or a transmit power control (TPC) feature.

11. The Wi-Fi device of claim 8, wherein after controlling, the Wi-Fi chip to perform the Wi-Fi network access or provide the hotspot service for the user equipment, the baseband chip is further configured to:
determined that the currently used Wi-Fi network channel is interfered;
determine that the Wi-Fi device supports a dynamic frequency selection (DFS) feature; and
control the Wi-Fi chip to switch to an interference-free channel to perform the Wi-Fi network access or provide the hotspot service for the user equipment.

12. The Wi-Fi device of claim 8, wherein after controlling the Wi-Fi chip to perform the Wi-Fi network access or provide the hotspot service for the user equipment, the Wi-Fi device is further configure to reduce transmit power of the Wi-Fi device when the baseband chip determines that a currently used Wi-Fi network channel is interfered, and determines that the Wi-Fi device supports a transmit power control (TPC) feature.

13. The Wi-Fi device of claim 8, wherein before controlling the Wi-Fi chip to perform the Wi-Fi network access or provide the hotspot service for the user equipment, the baseband chip is further configured to receive an update signal of an update channel, wherein the update signal is one of a roaming signal, an initial device use signal, a subscriber identity module (SIM)/User Identity Module (UIM) card insertion signal, a timing signal, and a power-on signal.

14. A wireless fidelity (Wi-Fi) network connection method, comprising:
acquiring, by a first Wi-Fi device, at least one packet broadcasted by a second Wi-Fi device, wherein each of the at last one packet comprises channel information comprising a channel list;
determining, by the first Wi-Fi device, target channel information based on the channel information; and either
performing, by the first Wi-Fi device based on the target channel information, Wi-Fi network access, or providing a hotspot service for a user equipment,
wherein, when the at least one packet comprises a plurality of packets, determining the target channel information comprises:
acquiring a plurality of channel lists from the plurality of packets;
determining a target channel list based on the plurality of channel lists; and
using the target channel list as the target channel information,
wherein, when the at least one packet comprises only one packet, determining the target channel information comprises:
acquiring a channel list from the one packet; and
using the channel list as the target channel information.

15. The Wi-Fi network connection method of claim 14, wherein determining the target channel list comprises:
comparing channels of the plurality of channel lists;
counting a quantity of the plurality of channel lists having a same channel; and
determining that channel lists having the same channel are the target channel lists when the quantity of the plurality of channel lists having the same channel reaches a set value.

16. The Wi-Fi network connection method of claim 14, wherein after performing the Wi-Fi network access or providing the hotspot service for the user equipment, the method further comprises:
determining that a currently used Wi-Fi network channel is interfered;
determining that the first Wi-Fi device supports a dynamic frequency selection (DFS) feature; and
switching to an interference-free channel to perform the Wi-Fi network access or provide the hotspot service for the user equipment.

17. The Wi-Fi network connection method of claim 14, wherein after performing the Wi-Fi network access or providing the hotspot service for the user equipment, the method further comprises:
determining that a currently used Wi-Fi network channel is interfered;
determining that the first Wi-Fi device supports a transmit power control (TPC) feature; and
reducing transmit power of the first Wi-Fi device.

18. The Wi-Fi network connection method of claim 14, wherein after performing the Wi-Fi network access or providing the hotspot service for the user equipment, the method further comprises:
determining that a currently used Wi-Fi network channel is interfered;

determining that the first Wi-Fi device does not support a dynamic frequency selection (DFS) feature or a transmit power control (TPC) feature; and prompting a user to manually configure a channel or disconnect a Wi-Fi network when the first Wi-Fi device.

19. The Wi-Fi network connection method of claim 14, wherein before determining the target channel information, the method further comprises receiving, by the first Wi-Fi device, an update signal of an update channel, wherein the update signal is one of a roaming signal, an initial device use signal, a subscriber identity module (SIM)/User Identity Module (UIM) card insertion signal, a timing signal, and a power-on signal.

* * * * *

UNITED STATES PATENT AND TRADEMARK OFFICE
CERTIFICATE OF CORRECTION

| | | |
|---|---|---|
| PATENT NO. | : 9,992,803 B2 | Page 1 of 1 |
| APPLICATION NO. | : 14/862747 | |
| DATED | : June 5, 2018 | |
| INVENTOR(S) | : Chao Xiang and Ping Yu | |

It is certified that error appears in the above-identified patent and that said Letters Patent is hereby corrected as shown below:

In the Claims

Column 23; Line 3; Claim 1 should read:
wherein, when the at least one packet comprises only one Column 23; Line 37; Claim 3 should read:
forming the Wi-Fi network access or providing the Column 24; Line 44; Claim 8 should read:
control, based on the target channel information, the Column 24; Line 47; Claim 8 should read:
wherein when the at least one packet comprises a plurality Column 24; Line 63; Claim 8 should read:
wherein, determining the target country code based on the Column 24; Line 67; Claim 8 should read:
counting a quantity of a same country code; and Column 25; Line 50; Claim 11 should read:
determined that the currently used Wi-Fi network channel Column 25; Line 60; Claim 12 should read:
device is further configured to reduce transmit power of the Signed and Sealed this
Thirty-first Day of July, 2018

Andrei Iancu
*Director of the United States Patent and Trademark Office*